US009000299B2

(12) United States Patent
Ruth

(10) Patent No.: US 9,000,299 B2
(45) Date of Patent: Apr. 7, 2015

(54) CABLE CLAMP HAVING WINGED FLANGES

(75) Inventor: Jason Ruth, Milan (IT)

(73) Assignee: Prysmian Power Cables and Systems USA, LLC, Lexington, SC (US)

( * ) Notice: Subject to any disclaimer, the term of this patent is extended or adjusted under 35 U.S.C. 154(b) by 101 days.

(21) Appl. No.: 13/184,839

(22) Filed: Jul. 18, 2011

(65) Prior Publication Data

US 2013/0020123 A1    Jan. 24, 2013

(51) Int. Cl.
*H02G 5/06* (2006.01)
*H02G 3/32* (2006.01)

(52) U.S. Cl.
CPC ...................................... *H02G 3/32* (2013.01)

(58) Field of Classification Search
CPC ....... F16L 3/1233; H01R 4/643; H05K 3/429; H05K 1/115; H02G 3/0431; H02G 3/045; H02G 11/00; H02G 3/22; B60R 16/0215; B60R 16/0222
USPC ..... 174/66, 70 C, 40 CC, 68.1, 72 A; 248/74, 248/229.1, 229.2, 226.1, 231.71, 231.81, 248/231.85, 63, 58, 68.1, 74.1, 375
See application file for complete search history.

(56) References Cited

U.S. PATENT DOCUMENTS

| | | | | | |
|---|---|---|---|---|---|
| 2,197,728 | A | * | 4/1940 | Lee | 248/70 |
| 2,198,093 | A | * | 4/1940 | Smythe | 174/79 |
| 2,550,001 | A | * | 4/1951 | Button | 248/49 |
| 2,690,193 | A | * | 9/1954 | Smith | 138/99 |
| 3,216,683 | A | * | 11/1965 | Girard | 248/68.1 |
| 3,531,071 | A | * | 9/1970 | Kubli | 248/68.1 |
| 4,020,531 | A | * | 5/1977 | Ahrens et al. | 24/284 |
| 4,028,899 | A | * | 6/1977 | Carmichael, III | 405/219 |
| 4,956,916 | A | * | 9/1990 | Robertson | 30/92 |
| 5,018,548 | A | * | 5/1991 | McLennan | 137/315.23 |
| 5,121,946 | A | * | 6/1992 | Jardine | 285/15 |
| 6,173,926 | B1 | * | 1/2001 | Elvegaard | 248/74.1 |
| 6,467,811 | B2 | * | 10/2002 | Mitchell | 285/15 |
| 6,892,990 | B2 | * | 5/2005 | Pisczak | 248/74.4 |
| 7,049,507 | B2 | * | 5/2006 | Sutehall et al. | 174/40 R |

(Continued)

FOREIGN PATENT DOCUMENTS

| | | |
|---|---|---|
| DE | 1 010 603 | 6/1957 |
| WO | WO 01/95450 | 12/2001 |

OTHER PUBLICATIONS

Communication from European Patent Office mailed Jul. 19, 2013, enclosing Extended European Search Report in corresponding European Patent Application No. EP 12176587.9 (9 pages).

*Primary Examiner* — Yuriy Semenenko
*Assistant Examiner* — Pete Lee
(74) *Attorney, Agent, or Firm* — Finnegan, Henderson, Farabow, Garrett & Dunner, L.L.P.

(57) ABSTRACT

A cable clamp for securing an electrical cable to a support structure has two substantially similar half-shells, each half-shell including a concave inner surface terminating in a pair of abutting surfaces. The half-shells further include a pair of winged flanges offset a distance from the abutting surfaces. The lower half-shell can first be secured to a support structure using a pair of elongate members passing through the winged flanges of the lower half-shell and a plurality of fastening members. A cable can then be placed within a cable receiving region of the lower half-shell and the top half-shell can be secured to the lower half-shell, applying a clamping force to the cable without interference from the fastening members used to secure the lower half-shell to the support structure.

13 Claims, 5 Drawing Sheets

(56) References Cited

U.S. PATENT DOCUMENTS 7,153,064 B2 * 12/2006 Zeilinger et al. ............. 405/221
8,099,887 B2 * 1/2012 McCoy et al. ................. 40/617
2006/0027713 A1 * 2/2006 van Walraven ............... 248/56
2009/0188203 A1 7/2009 Fox

* cited by examiner

United States Patent US 9,000,299 B2

CABLE CLAMP HAVING WINGED FLANGES

TECHNICAL FIELD

The present invention relates to clamps for mounting electrical power cables to a support structure. More particularly, the present invention relates to cable clamps having winged flanges for securing medium or high voltage cables to a support structure, where the clamp has minimal discrete parts and requires easy installation in confined areas.

BACKGROUND

For the transmission of electrical power, cables are often identified by the voltage levels they are designed to carry. Medium voltage cables are generally those intended for carrying 1 kV-35 kV, and high voltage cables are intended to carry above 35 kV.

Medium and high voltage cables can be installed in a number of settings. For example, they may be buried underground, installed in small passageways such as in manholes or ducts, or mounted in cable racks. When installed in manholes or ducts, the cables may be secured to a support structure. The securing helps confine the cables to a desired space, prevents movement of the cable in the manhole or duct when other portions of the cable are manipulated, and helps resist buckling of the cable that can occur when electrical power is applied to the cable.

Clamps are conventionally used to secure the cable to a support structure within manholes or ducts. To be effective, clamps must be robust, easy for the installer to use, and should accommodate a variety of cable sizes. Most clamps for medium and high voltage cables comprise two pieces. Generally, these two pieces are half-shells that, when mated during cable installation, surround the circumference of the cable at a particular longitudinal position of the cable. The bottom half-shell can be secured in some fashion to a support structure within the manhole or duct, preferably before positioning the cable. The cable is then placed so the bottom half-shell surrounds a portion of the cable, after which the top half-shell of the clamp is placed on the cable to surround its remaining portion. The two half-shells are then tightened together, thereby securing the cable. This tightening can be performed, for example, by some type of bolt arrangement serving to couple the bottom half-shell to the support structure.

FIG. 1 depicts a partial cross-section of a conventional two-piece cable clamp 1. The clamp has two primary pieces 3 and 5 that form half-shells to surround a cable when installed. The top half-shell 3 has flanges 7 through which a bore 11a is present, and the bottom half-shell 5 has flanges 9 through which a threaded bore 11b is present (as shown in FIG. 1 for one side of clamp 1). The threaded portion 13 of the bolt 17 engages into the lower end of the threaded bore 11b to secure the bottom half-shell 5 against a support structure (not shown). After bottom half-shell 5 is bolted, the cable may be positioned and half-shell 3 arranged over the cable. Another bolt 18 passing through the bore 11a secures top half-shell 3 to bottom half-shell 5 by engaging its threaded portion 15 into the upper end of the threaded bore 11b. Each half-shell 3 and 5 is fitted with cushioning 19 so as not to damage the cable when the clamp is tightened and to accommodate thermal expansion of the cable during cycling.

Applicant has observed that the clamp of FIG. 1 has a number of disadvantages. First, it is expensive, especially due to the threaded portions and the number of distinct parts comprising the clamp. The rubber cushioning 19 in clamp 1 also can degrade over time, shortening the life of the clamp. In addition, a clamp of the type depicted in FIG. 1 has a small number of cable sizes that it can accommodate. To secure different cable diameters, suitably sized bottom and top half-shells must be selected. For example, the clamp of the design in FIG. 1 requires at least fifteen different sizes for its half-shells to accommodate a cable diameters ranging from 70 mm to 146 mm.

Korean Patent Application Publication No. KR 2004/0015843 illustrates another design for a cable clamp having two half-shells. The bottom half-shell of that clamp is provided with two pairs of flanges. The first pair of flanges at the base of the half-shell are provided with bores. A pair of bolts extends through said bores and through a support structure. The bolts, and bottom half-shell, are then secured to the support structure with respective nuts.

The second pair of flanges is near the upper portion of the bottom half-shell. These are also provided with bores which mate to corresponding bores provided in a pair of flanges of the top half-shell. Each flange of the top half-shell also includes a chamber housing a spring assembly. The bolts extend through the bores provided in the top half-shell flanges and through the upper flanges of the bottom half-shell. Nuts can then be placed on the bolts to secure the top half-shell to the bottom half-shell. As a result, a cable can be secured between the bottom and top half-shells under a spring-loaded compression. While the spring assembly allows a range of cable sizes to be used with one cable clamp and eliminates the threaded inserts, the clamp design is relatively expensive due to the number of parts and manufacturing difficulties associated with the somewhat complicated casting of the chamber on the flanges of the top half-shell.

FIG. 2 depicts a side view of another conventional two-piece cable clamp 20. Clamp 20 employs a pair of springs 22. Both half-shells 24 and 26 are identical in size and shape. Both half-shells are provided with a pair of bore holes (not shown). A single bolt 28 passes through each bore hole on respective sides of top half-shell 24, through a corresponding bore hole of bottom half-shell 26, and through a support structure 30. A nut can then secure the bolt 28 and the clamp 20 to support structure 30.

Clamp 20 accommodates a limited range of cable diameters. For example, five different clamp sizes are needed to accommodate cable diameters from 70 mm-146 mm. Additionally, Applicant has found that, at least with respect to larger cable sizes, the half-shells are not sufficiently robust and may bend under prolonged clamping. Further, because clamp 20 relies on the same bolts and nuts to secure bottom half-shell 26 to support structure 30 and to tighten top half-shell 24 to bottom half-shell 26, installation is difficult. In particular, bottom half-shell 26 cannot be locked into place against support structure 30 before a cable 32 is secured into clamp 20 by the top half-shell 24.

Applicant has observed that known designs for cable clamps are not satisfactory for securing medium or high voltage cables within confined spaces such as manholes or ducts. Those designs lack the ability to mount cables with simple and convenient steps, require multiple parts to accommodate different cable diameters, and do not minimize the number of parts within the clamp assembly. They also lack the robustness required for fitting a single clamp assembly to a wide range of different sized cables without substantial risk of failure.

SUMMARY

Applicant has found that cable clamps having two substantially similar half-shells, each with a pair of winged flanges, enable quick and easy installation for securing medium and high voltage cables with a minimum number of parts. In particular, each half-shell has an inner surface defining a cable receiving region and having an arc-shaped radial cross-section. The edges of the arc-shaped radial cross section define an abutting surface. Each winged flange is provided with a bore hole for passage of an elongate member (e.g., a threaded rod). A plurality of fastening members (e.g., nuts) are provided to mate with the elongate members. Each winged flange projects from the outer surface of the respective half-shell and is located at a distance, or offset, from the abutting surface equal to or greater than half the thickness of the fastening members.

In use, the bottom half-shell can be secured to a support structure independently from the upper half-shell via the elongate members and fastening members. In particular, an installer can fix the bottom half-shell to a support structure by passing the elongate members through the bore holes of the support and of the flanges of the bottom half-shell and securing the elongate members and bottom half-shell using the fastening members. After placement of the cable into the receiving region of the bottom half-shell, the upper half-shell is secured to the bottom half-shell via the same elongate members passing through the bore holes of its flanges and fixed by additional fastening members. The position of the winged flanges, offset from the abutting surfaces of the half-shells, enables the abutting surfaces of the respective half-shells to approach or even contact each other without interference from the fastening members securing the bottom half shell to the support, allowing the complete closure of the receiving region for the cable. Springs can be advantageously provided on each rod outside of the upper half-shell in correspondence with the fastening members holding the upper half shell.

In one aspect consistent with the present disclosure, a cable clamp for securing a cable to a support structure includes a first and a second half-shell of substantially identical shape, each half-shell having opposing inner surfaces defining a cable receiving region, where the opposing inner surfaces terminate in respective abutting surfaces. The clamp further includes a pair of first flanges associated with the first half-shell, where each first flange is laterally adjacent the cable receiving region of the first half-shell and is vertically offset from the abutting surface of the first half-shell. The clamp also includes a pair of second flanges associated with the second half-shell, where each second flange is laterally adjacent the cable receiving region of the second half-shell and is vertically offset from the abutting surface of the second half-shell.

In another aspect, the cable clamp has a pair of elongate members configured to facilitate coupling of the first half-shell to the second half-shell. Each elongate member is capable of passing through a flange of the pair of first flanges and of the pair of second flanges and, in one embodiment, comprises a threaded rod. The threaded rod can be configured to mate with fastening members for securing the first and the second half-shell to a support structure and one another. As first and second half-shells have substantially identical shape, each of them can be secured to the support or the support secured half-shell. In the following description, the first half-shell will be the one to be secured to the support and the second half-shell will be the one secured to the first half-shell.

The first and second half-shells preferably have opposing inner surfaces that include a concave surface. Each of the concave surfaces exhibits a cross-section having a substantially constant radius of curvature. Preferably, the concave surfaces have a truncated semi-circular cross-section.

In another aspect consistent with the present disclosure, a method for securing a cable to a support structure begins with providing a first and a second half-shell, each half-shell having an outer surface, an inner surface defining a cable receiving region, a pair of abutting surfaces, and a pair of flanges each having a bore and being offset from the abutting surfaces by at least half the thickness of lower fastening members. The method of securing includes positioning the outer surface of the first half-shell adjacent a support structure, passing an elongate member through the bore of each flange of the first half-shell, and securing the first half-shell and the elongate members to the support structure using a pair of first fastening members.

Following securing the first half-shell, the method includes positioning a cable within the cable receiving region of the first half-shell, positioning the cable receiving region of the second half-shell over the cable by passing each elongate member through a respective bore of the second half-shell, and securing the second half-shell to the first half-shell using a pair of second fastening members. In one variation, the method may include, after positioning the cable receiving region of the second half-shell over the cable, positioning a compression member over each elongate member.

Additional objects and advantages of the present disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the cable clamp, as claimed.

The accompanying drawings, which are incorporated in and constitute a part of this specification, illustrate several embodiments and together with the description, serve to explain the principles of the cable clamp.

DESCRIPTION OF EXEMPLARY EMBODIMENTS

Reference will now be made in detail to exemplary embodiments of the cable clamp, examples of which are illustrated in the accompanying drawings. Wherever possible, the same reference numbers will be used throughout the drawings to refer to the same or like parts.

For the purpose of the present description and of the appended claims, except where otherwise indicated, all numbers expressing amounts, quantities, percentages, and so forth, are to be understood as being modified in all instances by the term "about." Also, all ranges include any combination of the maximum and minimum points disclosed and include any intermediate ranges therein, which may or may not be specifically enumerated herein.

Applicant has found that a two-piece cable clamp for medium and high voltage cables that has two interchangeable half-shells, each half-shell having winged flanges, can accommodate cable diameters from 70 mm-146 mm with only three different sized half-shells. Additionally, due to the winged flanges, the first (bottom) half-shell of the disclosed clamp can be secured to a support before a cable is inserted into the first half-shell, even though the same elongate members (e.g., threaded rods) are used to secure both the second (top) and first half-shells.

Figure 3:
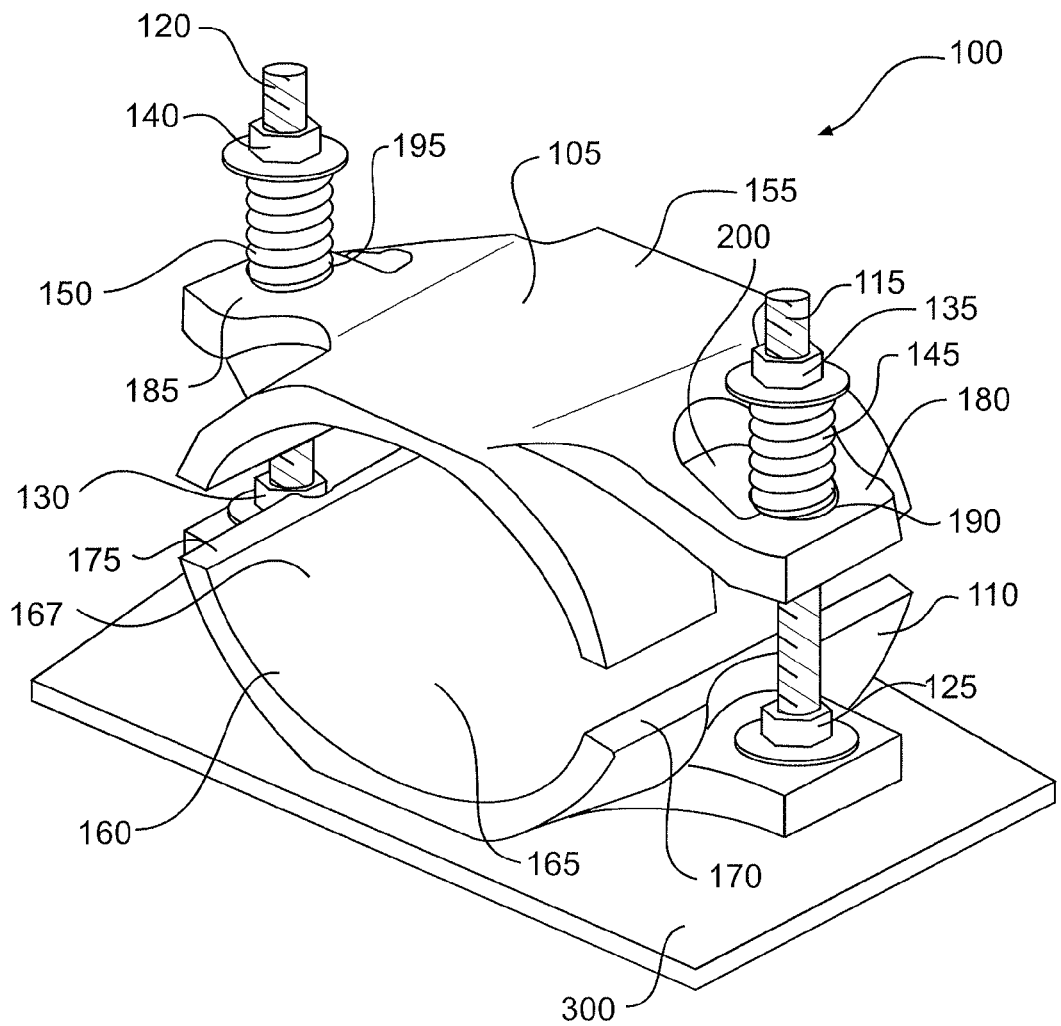
FIG. 3 is a perspective view of a cable clamp consistent with an exemplary disclosed embodiment.

FIG. 3 depicts an exemplary embodiment of a cable clamp 100 for securing a cable to a support surface 300. In one aspect, cable clamp 100 can comprise a top half-shell 105, a bottom half-shell 110, a pair of threaded rods 115, 120, a pair of first fastening members 125, 130, a pair of second fastening members 135, 140, and a pair of compression members 145, 150.

In one aspect, top half-shell 105 and bottom half-shell 110 are substantially identical and/or interchangeable. In this manner, manufacturing costs, as well as inventory requirements, can be reduced. Half-shells 105, 110 can be made of any suitable material. For example, half-shells 105, 110 can comprise one or more metal, polymer, or a combination thereof. In one embodiment, half-shells 105, 110 can comprise a non-magnetic aluminum. In other embodiments, half-shells 105, 110 can comprise some other metal or metal alloy. It is noted that these materials are only exemplary, and any suitable material, synthetic or natural, can be used in forming the half-shells.

In one aspect, each half-shell has an outer surface 155 and an inner surface 160. In one embodiment, inner surface 160 can be a concave or arc-shaped surface defining a cable receiving region 165. In this manner, when top half-shell 105 and bottom half-shell 110 are cooperatively positioned such that their inner surfaces oppose one another, the half-shells form a clamp body exhibiting a cable channel defined by respective cable receiving regions 165 of half-shells 105, 110.

In one embodiment, inner surface 160 of each half-shell can exhibit a semi-circular cross-section. Alternatively, inner surface 160 can exhibit a cross-section resembling a partial or truncated semi-circle. In either case, the radius of curvature along inner surface 160 is substantially constant. It is noted that the term "truncated semi-circle," as used herein, refers to a substantially semi-circular cross-section, a portion of which has been removed or omitted. As a result, in one embodiment, opposing half-shells 105, 110, each comprising truncated semi-circular inner surfaces 160, can be moved close to each other, or in contact with one another, so as to effectively clamp a cable that exhibits a smaller radius than the radius of curvature of inner surface 160 of either half-shell.

In other embodiments, inner surface 160 can exhibit some other arc-shaped or concave cross-section. For example, inner surface 160 can exhibit a substantially elliptical cross-section. Alternatively, inner surface 160 can comprise one or more linear or curvilinear walls.

In another aspect, inner surface 160 can terminate on each of its lateral sides at abutting surfaces 170, 175. It is noted that, although the term "abutting" is used to describe these surfaces, in use, when top half-shell 105 and bottom half-shell 110 are cooperatively positioned such that their inner surfaces 160 oppose one another, abutting surfaces 170, 175 of the respective half-shells do not necessarily need to contact one another. Rather, they oppose and converge with respect to one another until a cable between the half-shells is sufficiently secured. In some embodiments, (e.g., the embodiment depicted in FIG. 4) abutting surfaces 170, 175 of the respective half-shells will be spaced apart from one another by some distance, and a cable can be secured between half-shells 105, 110. In other embodiments, abutting surfaces 170, 175 of the respective half-shells can be spaced farther or closer together, or even in contact with an opposing abutting surface, when a cable is secured within the clamp.

Inner surface 160 and/or abutting surfaces 170, 175 can exhibit a variety of textures and/or surface profiles that can affect the coefficient of friction between the cable clamp half-shells and a cable secured within the clamp. For example, inner surface 160 and/or abutting surface 170, 175 can be smooth surfaces having a relatively low coefficient of friction, or rougher surfaces exhibiting a higher coefficient of friction. Additionally, inner surface 160 and/or abutting surfaces 170, 175 can be coated with an epoxy. Alternatively, surfaces 160, 170, 175 can be uncoated. Typically, coated surfaces reduce corrosion and lengthen the effective life of the clamp. However, uncoated surfaces generally produce a higher pull-out force for the cable. Alternatively, a coating can be applied to inner surface 160 and/or abutting surface 170, 175 that may result in a higher coefficient of friction, and thus, a higher pull-out force than exhibited by an uncoated clamp.

Top and bottom half-shells 105, 110 can further comprise a pair of opposing flanges 180, 185 extending from each of their outer surfaces 155. In one embodiment, flanges 180, 185 can be formed integrally with the respective half-shells 105, 110 in order to reduce manufacturing costs. As depicted in FIG. 3, opposing flanges 180, 185 can comprise a chamfered portion on both their upper and lower surfaces that taper from the half-shells out towards the lateral edges of the flanges. In this manner, molding or casting the half-shells and flanges together remains relatively simple and within the knowledge of those skilled in the art, while the structural integrity of the half-shells and flanges is maintained. In other embodiments, flanges 180, 185 and half-shells 105, 110 can be integrally formed in some other fashion. Alternatively, flanges 180, 185 can be formed separately from half-shells 105, 110. The flanges can then be coupled to the half-shells in some appropriate manner.

In one aspect, each flange can comprise a bore hole 190, 195. The diameter of bore holes 190, 195 can vary depending on the diameter of threaded rods 115, 120 and the outer diameter of first fastening members 125, 130 and second fastening members 135, 140. In one embodiment, the diameters of bore holes 190, 195 are large enough to insert threaded rods 115, 120 through flanges 180, 185, while being small enough to prevent first fastening members 125, 130 and second fastening members 135, 140 from passing through the bore holes.

In another aspect, each flange can be located adjacent to and on either side of cable receiving region 165. Additionally, flanges 180, 185 can be located a distance, or offset, from abutting surfaces 170, 175 to facilitate, when necessary, contact between top half-shell 105 and bottom half-shell 110. In one embodiment, each flange is offset from the abutting surfaces by a distance equal to or greater than half the thickness of the fastening members 125, 130, 135, 140. In this manner, first fastening members 125, 130 can be positioned adjacent flanges 180, 185 of bottom half-shell 110, but do not prevent abutting surfaces 170, 175 of top half-shell 105 from converging towards, or even contacting, abutting surfaces 170, 175 of bottom half-shell 110. In other embodiments, flanges 180, 185 can be located further from or closer towards abutting surfaces 170, 175. Flanges 180, 185 can further comprise a recessed portion 200, 205 extending downward from outer surface 155 to accommodate first fastening members 125, 130, second fastening members 135, 140, and/or compression members 145, 150. Again, recessed portions 200, 205 can be sufficiently deep to ensure first fastening members 125, 130 do not interfere with top half-shell 105 as it approaches or contacts bottom half-shell 110. Additionally, recessed portions 200, 205 can make it easier for an installer to tighten fastening members 125, 130.

In the depicted embodiment, threaded rods 115, 120 each extend from above outer surface 155 of top half-shell 105, through one of bore holes 190, 195 of top half half-shell 105, through a corresponding one of bore holes 190, 195 of bottom half-shell 110, and through holes in support structure 300. Threaded rods 115, 120 can be formed of any suitable material, including metal, metal alloy, polymer, or a combination thereof. Further, threaded rods 115, 120 can be threaded over some or all of their lengths and sized so as to mate with first fastening members 125, 130, second fastening members 135, 140, and/or compression members 145, 150.

In one embodiment, threaded rods 115, 120 can be elongate members without a head on either end. In other embodiments, rods 115, 120 can be bolts, exhibiting a head on one end. Specifically, where threaded rods 115, 120 are bolts exhibiting a head on one end, the bolt heads can be positioned behind support surface 300. In this manner, bottom half-shell 110 can still be secured to support surface 300 independent of top half-shell 105 being secured to bottom half-shell 110.

In use, an installer can place outer surface 155 of bottom half-shell 110 adjacent support surface 300, insert threaded rods 115, 120 through respective bore holes 190, 195 of bottom half-shell 110 and into holes in support structure 300. Third fastening members 310, 315 (visible in FIG. 4) can then be placed over the distal ends of each threaded rod 115, 120, behind support surface 300. Next, the installer can place first fastening members 125, 130 over the proximal ends of each threaded rod 115, 120, and tighten first fastening members 125, 130 until they are in sufficient contact with bottom half-shell 110 so as to secure bottom half-shell 110 to support surface 300. In one embodiment, third 310, 315 and/or first fastening members 125, 130 can comprise nuts having internal threading corresponding to the external threading of threaded rods 115, 120. In other embodiments, third fastening members 310, 315 and/or first fastening members 125, 130 can comprise some other body suitable for mating with threaded rods 135, 140 and securing bottom half-shell 110 to support surface 300.

Once bottom half-shell 110 is secured, the installer can position a cable within cable receiving region 165 of bottom half-shell 110. Next, the installer can position inner surface 160 of top half-shell 105 in contact with the cable by mating bore holes 190, 195 over the proximal ends of threaded rods 115, 120, and sliding top half-shell 105 distally, along threaded rods 115, 120, towards bottom half-shell 110.

Finally, the installer can secure top half-shell 105 to bottom half-shell 110 by placing compression members 145, 150 over the proximal ends of threaded rods 115, 120, then placing second fastening members 135, 140 over the proximal ends of threaded rods 115, 120 and tightening second fastening members 135, 140 until sufficient pressure is being applied to the cable, also thanks to compression members 145, 150, between bottom half-shell 110 and top half-shell 105.

In one embodiment, compression members 145, 150 can comprise a pair of springs. For example, compression members 145, 150 can comprise a steel spring exhibiting a spring rate of approximately 4000 lbs/in (about 700.5 N/mm). In alternative embodiments, compression members 145, 150 can comprise some other body, rather than a spring, that is capable of applying a range of clamping forces to a cable between half-shells 105, 110. For example, compression members 145, 150 can comprise resilient layers situated adjacent inner surface 160 of one or both half-shells, within cable receiving region 165.

In use, compression members 145, 150 can serve to provide a substantially constant force on a cable secured in the clamp 100, even as the cable expands and contracts during operation. Further, although compression members exhibiting a spring rate of approximately 4000 lbs/in (about 700.5 N/mm) are provided, this spring rate is exemplary only and is not intended to exclude the use of compression members exhibiting some other spring rate. In practice, several factors can contribute to spring rate. For example, a spring material composition, wire diameter, outer diameter, inner diameter, pitch, length, applied force, and compliance, among others, can all affect a particular compression member spring rate. Thus, a compression member exhibiting a substantially different spring rate could be used as a substitute for the compression member described above by selecting a suitable spring exhibiting, for example, a different wire diameter, outer diameter, pitch, material, etc.

It is further noted that the clamping force of cable clamp 100 can vary depending on the particular application. For example, cables clamped on a horizontal support structure usually do not need as much clamping force as a cable clamped on a vertical support structure.

Second fastening members 135, 140, like third fastening members 310, 315 and/or first fastening members 125, 130, can comprise nuts having internal threading corresponding to the external threading of threaded rods 115, 120. In other embodiments, second fastening members 125, 130 can comprise some other body suitable for mating with threaded rods 135, 140 and securing top half-shell 105 to bottom half-shell 110. Additionally, washers can be used in conjunction with second fastening members 125, 130 where appropriate.

Figure 4:
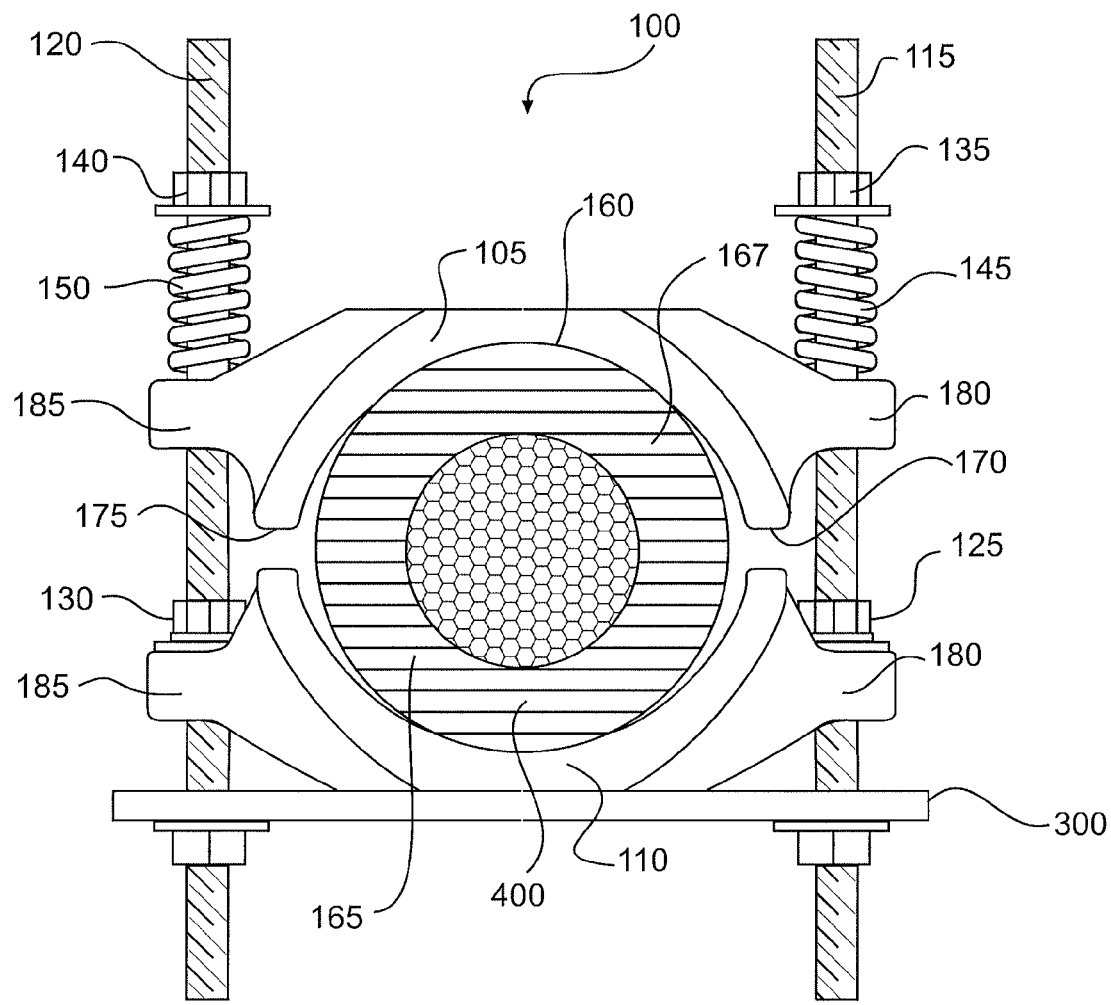
FIG. 4 is a side view of the cable clamp illustrated in FIG. 3 when mounted on a cable.

FIG. 4 depicts a side view of cable clamp 100 securing a cable 400 to support surface 300. In one aspect, opposing flanges 180, 185 of respective half-shells 105, 110 can be integral with the half-shells and positioned adjacent cable receiving region 165 of each. It is noted, with respect to the depicted embodiment, that opposing flanges 180, 185 are not located flush with abutting surfaces 170, 175 of each half-shell. Rather, opposing flanges 180, 185 can be located offset from abutting surfaces 170, 175. The positioning of opposing flanges 180, 185 in this manner can result in a single clamp size being able to accommodate more cable sizes. In other words, the useable cable range of the clamp can increase. This can be accomplished because first fastening members 125, 130, located adjacent flanges 180, 185 of bottom half-shell 110, may not impede top half-shell 105 from converging close to, or even contacting, bottom half-shell 110. It is noted, however, in the particular embodiment depicted in FIG. 4, clamping the cable shown therein, that abutting surfaces 170, 175 of the respective half-shells 105, 110 do not contact one another.

Additionally, as a result of the opposing offsets of flanges 180, 185 with respect to both half-shells 105, 110, when top half-shell 105 and bottom half-shell 110 are cooperatively positioned such that their inner surfaces 160 oppose one another, a gap is created between the flanges of top half-shell 105 and the flanges of bottom half-shell 110. This gap can provide a working space for an installer such that the position of first fastening members 125, 130 can easily be adjusted, even in a situation where the half-shells are very close or in contact with one another.

In another aspect, cable clamp 100 can accommodate a larger range of cable sizes partially due to the cross-sectional shape of inner surface 160 of both half-shells. As discussed earlier, in one embodiment, the cross-section of inner surface 160 of each half-shell can resemble a truncated semi-circle. It should be noted that the term "semi-circle" is not being used in its precise geometric sense. Rather, the cross-section of inner surface 160 merely resembles a substantially semi-circular shape and exhibits approximately the same radius of curvature across its entire surface. The term "truncated," merely means that a portion of the semi-circular cross-section can be removed or omitted. For example, in one embodiment, a portion of the lateral sides of inner surface 160, where they terminate at abutting surfaces 170, 175, have been removed or omitted, as would be known to those skilled in the art. As a result of the truncation of inner surface 160 with respect to both half-shells 105, 110, in a case where abutting surfaces 170, 175 of half-shells 105, 110 are moved close to each other, or in contact with one another, the half-shells are capable of clamping a cable exhibiting a smaller radius than the radius of curvature of inner surface 160 of either top half-shell 105 or bottom half-shell 110.

The length of compression members 145, 150 of clamp 100, as well as the length of threaded rods 115, 120, can also contribute to the accommodation of a larger range of cable sizes. For example, in one embodiment, compression members 145, 150 and threaded rods 115, 120 can be selected so as to allow half-shells 105, 110 to secure the largest cable that the half-shells are designed to accommodate. In other words, incorrect selection of compression members 145, 150 and/or threaded rods 115, 120 may lead to unnecessary limitations on the cable sizes the half-shells could otherwise accommodate. Further, a compression member 145, 150 exhibiting a particular length, spring rating, and/or other characteristics can be selected so as provide sufficient clamping force to a particular cable size to be secured within the clamp.

Figure 1:
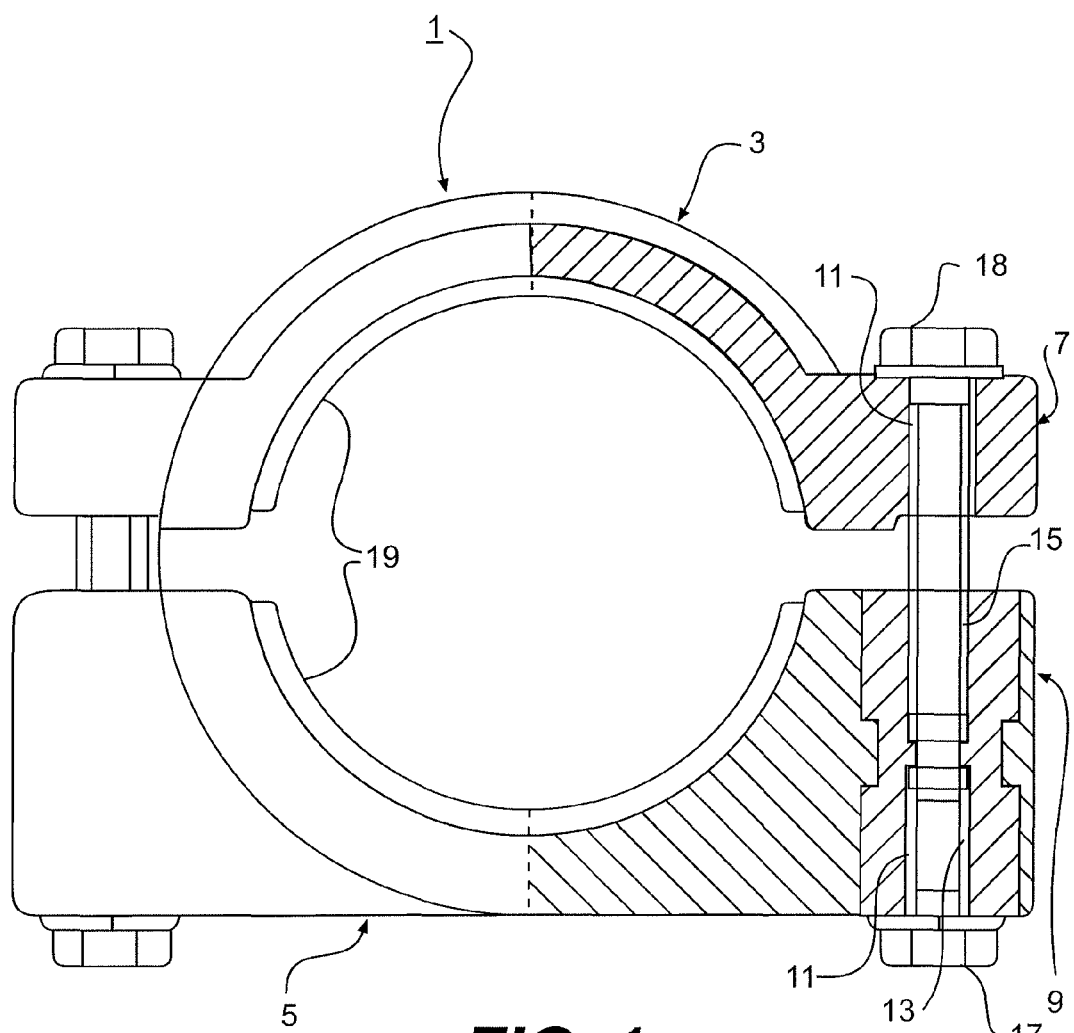
FIG. 1 is a partial cross-sectional view of a first type of conventional cable clamp.
Figure 2:
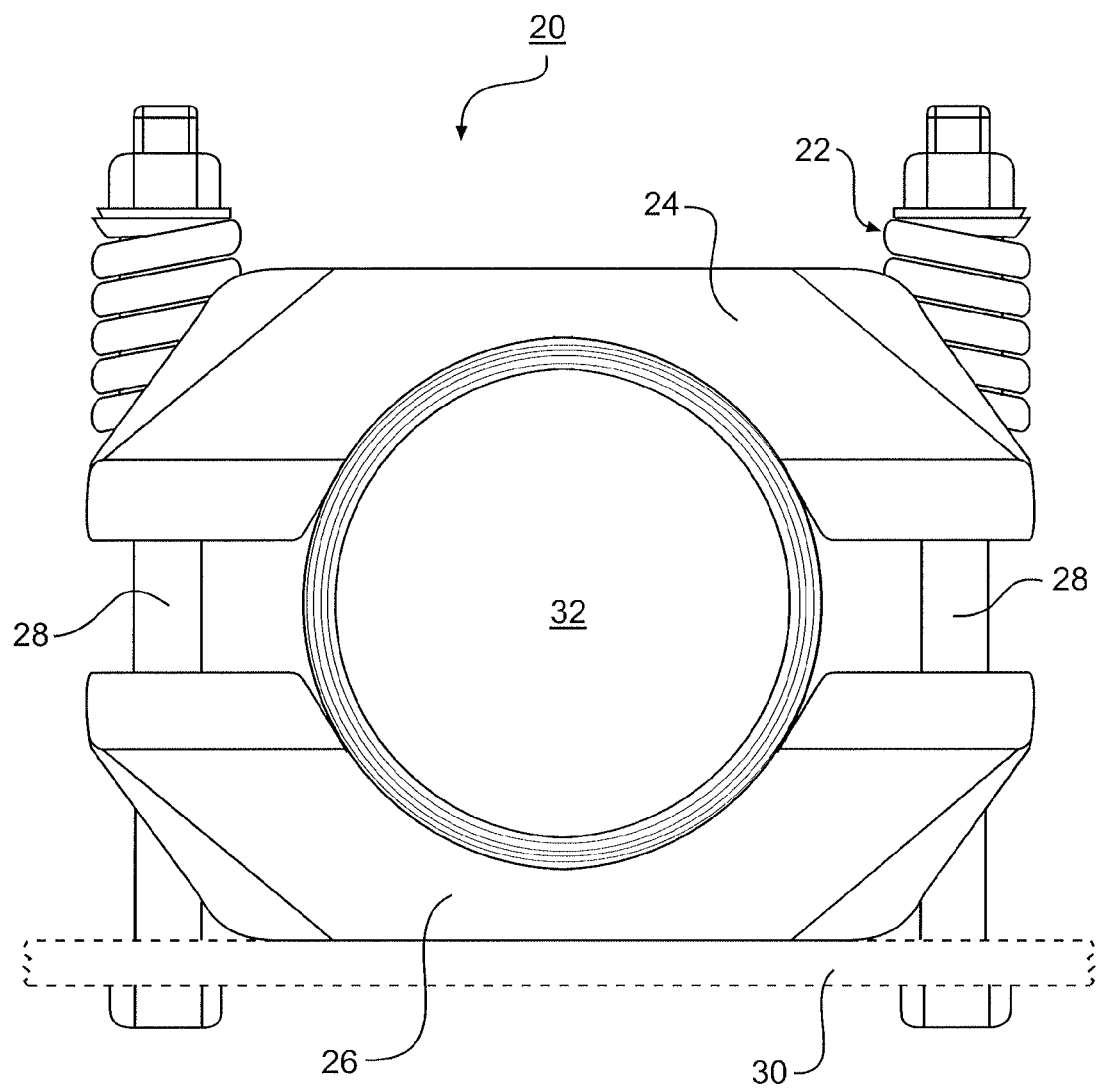
FIG. 2 is a side view of a second type of conventional cable clamp.

In one aspect, clamp 100 can accommodate cable diameters ranging from 70 mm-146 mm with only three different clamp sizes (compare this to the known clamp of FIG. 2 that requires five different clamp sizes to secure cables of the same diametric range).

Figure 5:
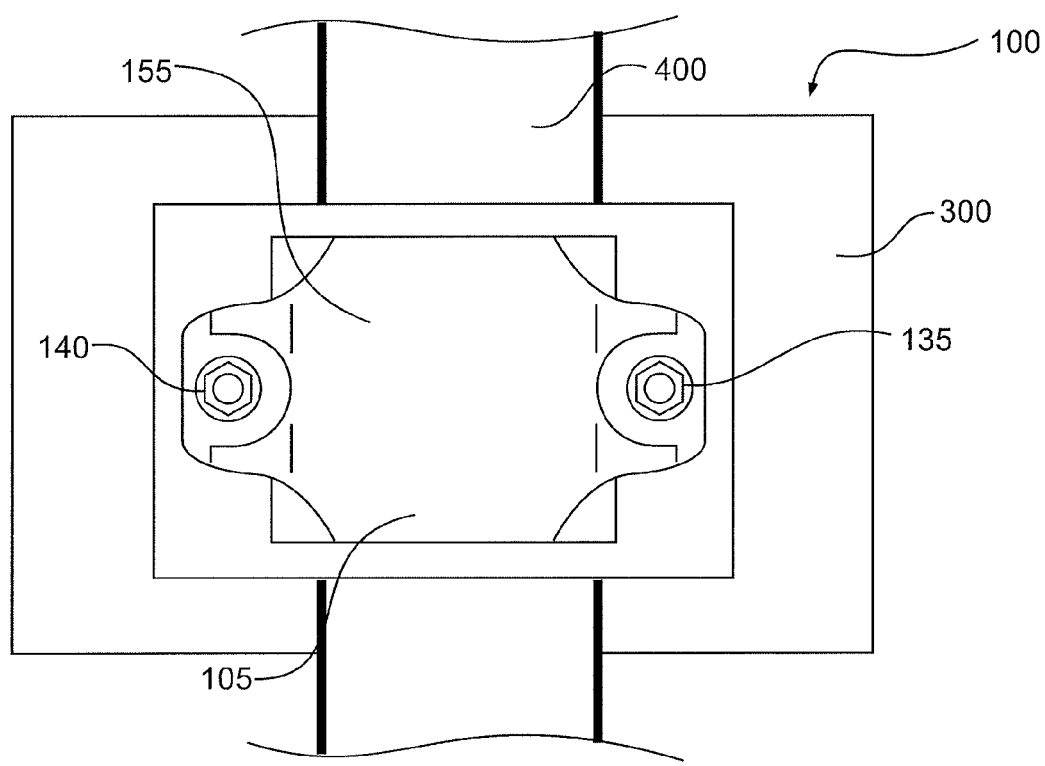
FIG. 5 is a top view of the cable clamp of FIG. 4.

FIG. 5 depicts a top view of cable clamp 100 securing cable 400 to support structure 300. In one aspect, the length of cable clamp 100, measured in the longitudinal direction of cable 400, can be observed. In one embodiment, the length of cable clamp 100 is approximately twice the length of other known cable clamps. Furthermore, it can be seen that outer surface 155 of half-shells 105, 110 are solid. The increased length of cable clamp 100 and/or the solid nature of half-shells 105, 110 can result in a clamp more resistant to failure. This is especially true in the case of a relatively large cable being positioned between the half-shells. Additionally, the increased clamp length can allow for approximately 40% fewer clamps needed to hold a cable over a given distance.

A cable clamp according to the present disclosure which accommodates a range of cable diameters from approximately 122 mm-146 mm was constructed of non-magnetic aluminum and was coated with epoxy powder coated black to resist corrosion. The length of the clamp, measured in the longitudinal direction of the cable being held therein was approximately 12.7 cm. The radius of curvature of the cable receiving region of each half shell was approximately 7.3 cm. When a cable with a diameter of 146 mm, the largest diameter accommodated by this particular embodiment of cable clamp 100, was held in the cable channel, the gap between the abutting surfaces of the two half-shells was approximately 3.175 cm. With a minimum gap of approximately 0 cm, accommodating a cable diameter of approximately 114 mm is theoretically possible. However, because the edges of the half-shells would thus be in contact, the pull-out force of the cable clamp could be too low. As a result, a minimum cable diameter, to assure sufficient pull-out force, would preferably be approximately 122 mm, the gap between the half-shells thus being approximately 8 mm.

The spring used in this embodiment of clamp 100 had a spring rate of approximately 4046 lbs./in. (about 708.5 N/mm) and an uncompressed height of approximately 2.125 in. (5.4 cm). The spring was compressed by tightening the second fastening members to a height of approximately 1.92-1.97 in. (4.88 cm-5.0 cm).

Tests were performed to measure the pullout force of three cable clamps. The three designs tested were: an uncoated known clamp as depicted in FIG. 2; an uncoated clamp according to the present disclosure; and an epoxy coated clamp according to the present disclosure.

A hydraulic cylinder was used to apply tension through a load cell and pulling eye onto the conductor of the cable. The cable sample was approximately 12 ft. (about 3.65 m) long with a 1000 kcmil (about 508 mm$^2$) copper conductor, rated at 345 kV, 4.65 in. (about 112 mm) diameter, and having an HDPE jacket with graphite coating. A pulling eye and large washers were installed on the training end of the cable to prevent slippage between the conductor and cable. No conductor movement was detected throughout all the tests.

Each cable clamp design was assembled, anchoring the cable to a test frame. Stainless steel springs from Newcomb Spring Company were used to apply the clamping force. The pullout force was tested for various spring heights ranging from approximately 2.12 in. (about 54 mm) to 1.92 in. (about 48.7 mm) in 0.05 in. (about 1.3 mm) increments. All hardware was approximately 0.5 in. (about 13 mm) diameter hot dipped galvanized. The torque required to compress the springs beyond approximately 1.92 in. (about 48.7 mm) was too large to comfortably achieve with a standard wrench.

The pullout force was measured by slowly and steadily increasing the tension applied to the conductor until the cable slipped through the clamps. The maximum tension was recorded. The tension was decreased to approximately half value, spring height was adjusted, and tension was again increased until the cable slipped through the clamp. The pulling force could be controlled to within approximately 10 lbs. (about 4.5 kg) and was increased at a rate of approximately 15 lbs. (about 6.8 kg) per 3 seconds. The three clamp designs were tested twice each to verify repeatability. Between each test the clamp assembly was completely disassembled and new springs were used. A slight permanent deformation was observed in the springs after compression to approximately 1.92 in. (about 48.7 mm). Some variability in the initial height of the springs was observed. The manufacturing tolerance of the spring initial height is not specified, but the observed variations were within typical manufacturing tolerances.

Given a spring installation height of between approximately 1.97 in. (about 50 mm) and 1.93 in. (about 49 mm), the linear regression model predicts with a 95% confidence that the pullout forces will be within the following ranges:

Known clamp of FIG. 2 (uncoated): 591±120 lbs. (about 268±54.4 kg).

Clamp according to present disclosure (uncoated): 1060±154 lbs. (about 480.8±69.8 kg).

Clamp according to present disclosure (coated with epoxy): 564±88 lbs. (about 255.8±40 kg).

The data shows that cable clamp 100 of the present disclosure, coated with epoxy, had similar pull-out performance to the known clamp of FIG. 2, which is uncoated. If uncoated, cable clamp 100 of the present disclosure had a greater pull-out force.

Other embodiments of cable clamp 100 will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A cable clamp for securing a cable to a support structure, comprising: a first and a second half-shell of substantially identical shape, each having opposing inner surfaces defining a cable receiving region, the opposing inner surfaces terminating in respective abutting surfaces; a pair of first flanges associated with the first half-shell, the first flanges comprising inner surfaces and outer surfaces, the first flanges being laterally adjacent the cable receiving region of the first half-shell, the first flanges having first bores for receiving elongate members, the inner surfaces of the first flanges being substantially perpendicular to the first bores, and the inner surfaces of the first flanges being vertically offset from the abutting surface of the first half-shell by a distance;

a pair of second flanges associated with the second half-shell, the second flanges comprising inner surfaces and outer surfaces, the second flanges being laterally adjacent the cable receiving region of the second half-shell, the second flanges having second bores for receiving the elongate members, the outer surfaces of the second flanges being substantially perpendicular to the second bores, and the inner surfaces of the second flanges being vertically offset from the abutting surface of the second half-shell by the distance; and a pair of elongate members configured to facilitate coupling of the first half-shell to the second half-shell, each elongate member being capable of passing through respective first and second flanges; a pair of first adjustable fastening members configured to mate with the respective pair of elongate members and to engage the inner surfaces of the pair of first flanges for securing the first half-shell to a support structure independently from the second half-shell, the first adjustable fastening members having a thickness less than twice the distance of the vertical offsets; and a pair of second adjustable fastening members configured to mate with respective portions of the elongate members extending beyond an outer surface of the second half-shell and to engage the outer surfaces of the pair of second flanges for securing the second half-shell to the first half-shell.

2. A cable clamp according to claim 1, wherein each elongate member comprises a threaded rod.

3. A cable clamp according to claim 1, wherein the opposing inner surfaces of the first and second half-shells each comprise a concave surface.

4. A cable clamp according to claim 3, wherein each of the concave surfaces exhibit a cross-section having a substantially constant radius of curvature.

5. A cable clamp according to claim 4, wherein each of the concave surfaces exhibit a truncated semi-circular cross-section.

6. A cable clamp for applying a clamping force to a cable, comprising:

a first half-shell comprising an outer surface and an inner surface, the outer surface configured for placement against a support surface, the inner surface defining a cable receiving region of a substantially semi-circular shape and terminating at an abutting surface;

a second half-shell comprising an outer surface and an inner surface, the inner surface of the second half-shell defining a cable receiving region of a substantially semi-circular shape and terminating at an abutting surface, the inner surface of the second half-shell being configured to oppose the inner surface of the first half-shell;

a pair of first flanges associated with the first half-shell, the first flanges having upper surfaces, the first flanges being offset from the abutting surface of the first half-shell in a direction towards the support surface, the upper surfaces of the first flanges being positioned away from and substantially parallel to the support surface;

a pair of second flanges associated with the second half-shell, the second flanges having upper surfaces, the second flanges being offset from the abutting surface of the second half-shell in a direction away from the support surface, the upper surfaces of the second flanges being positioned away from and substantially parallel to the support surface; a pair of elongate members configured to facilitate coupling of the first half-shell to the second half-shell, each elongate member being capable of passing through the respective first and second flanges;

a pair of first adjustable fastening members configured to mate with the respective pair of elongate members and to engage the upper surfaces of the first flanges for securing the first half-shell to the support structure independently from the second half-shell, the first adjustable fastening members having a thickness less than a distance of the combined offsets of the first and second flanges; and a pair of second adjustable fastening members configured to mate with respective portions of the elongate members extending beyond an outer surface of the second half-shell and to engage the upper surfaces of the second flanges for securing the second half-shell to the first half-shell.

7. A cable clamp according to claim 6, wherein the first and second flanges are offset a sufficient distance so as to allow positioning of the first fastening members between the first and second flanges without preventing contact between the abutting surfaces of the first and second half-shells.

8. A cable clamp according to claim 6, further comprising: compression members configured to maintain a substantially constant clamping force on a cable secured between the first half-shell and the second half-shell.

9. A cable clamp according to claim 6, further comprising: compression members configured for positioning between the pair of second flanges and the second adjustable fastening members, the compression members being capable of imparting a selectable clamping force to a cable clamped between the first and second half-shell.

10. A cable clamp according to claim 8, wherein the compression members are springs.

11. A method for securing a cable to a support structure, comprising:

providing a first and a second half-shell, each half-shell comprising an outer surface, an inner surface defining a cable receiving region, a pair of abutting surfaces, and a pair of flanges offset from the abutting surfaces by at least half the thickness of first fastening members, each of the flanges having a bore and surfaces substantially perpendicular to the bore;

positioning the outer surface of the first half-shell adjacent a support structure;

passing elongate members through the bores of each flange of the first half-shell;

securing the first half-shell and the elongate members to the support structure independent from the second half-shell using first adjustable fastening members to engage the flange surfaces of the first half-shell away from the support structure;

positioning a cable within the cable receiving region of the first half-shell;

after securing the first half-shell and the elongate members to the support structure, positioning the cable within the cable receiving region of the second half-shell by passing each elongate member through a respective bore of the second half-shell;

securing the second half-shell to the first half-shell using second fastening members to engage the flange surfaces of the second half-shell away from the support structure.

12. A method according to claim 11, further comprising:

after positioning the cable within the cable receiving region of the second half-shell, positioning a compression member over each elongate member.

13. A method according to claim 11, wherein securing the second half-shell to the first half-shell further comprises:

applying a sufficient clamping force to the cable in the cable receiving region of the first and second half-shells to secure the cable to the support structure.

* * * * *